Dec. 26, 1933.  O. E. FISHBURN  1,941,167
BRAKE
Filed Oct. 15, 1930
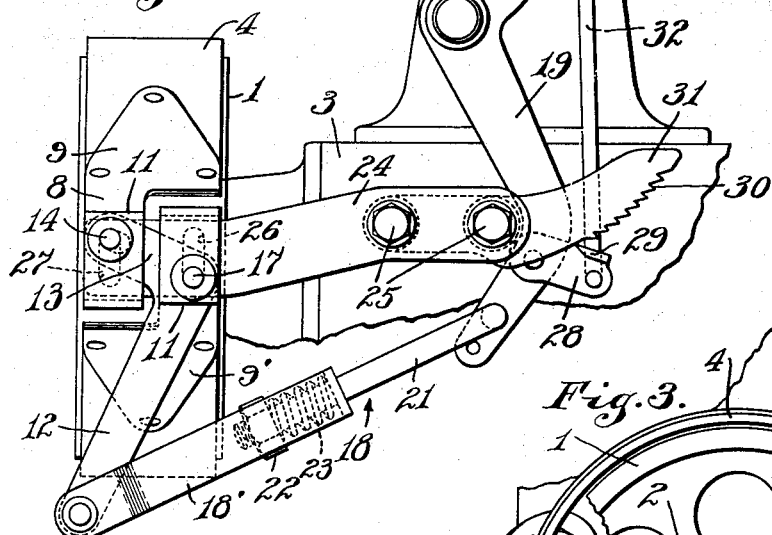
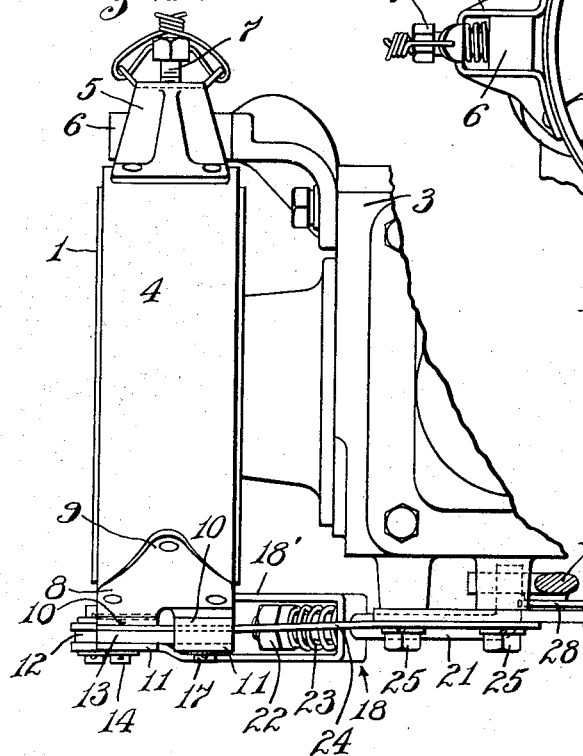
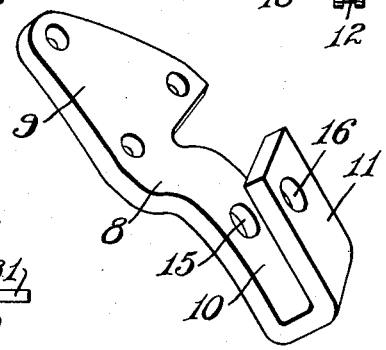
INVENTOR.
Otto E. Fishburn,
BY
Hood & Hahn.
ATTORNEYS Patented Dec. 26, 1933

1,941,167

UNITED STATES PATENT OFFICE 1,941,167

BRAKE

Otto E. Fishburn, Muncie, Ind., assignor to Warner Gear Company, Muncie, Ind., a corporation of Indiana Application October 15, 1930. Serial No. 488,908

8 Claims. (Cl. 188—77)

My invention relates to improvement in brake operating mechanism and particularly to brake operating mechanism for automobiles. My invention is advantageously applicable to that type of brake which is connected to the propeller shaft of an automobile.

It is one of the objects of my invention to provide a brake which shall be extremely simple, which shall require but few parts and which shall be efficient in its operation.

For the purpose of disclosing my invention I have illustrated one embodiment thereof in the accompanying drawing, in which:

Fig. 1 is a side elevation of a part of an automobile transmission and showing my brake;

Fig. 2 is a plan view thereof;

Fig. 3 is an end view; and

Fig. 4 is a perspective view of one of the brake band lugs.

In the structure illustrated the brake drum 1 is mounted on the propeller shaft 2, of an automobile transmission, immediately to the rear of the transmission housing 3. This drum is surrounded by a brake band 4 which, intermediate of its ends is provided with a support 5 adapted to receive a supporting lug 6 mounted on the transmission housing. An adjusting screw 7 in the support 5, has its end engaging the lug 6 for the purpose of adjusting the brake band at this point. The free ends of the brake band lie diametrically opposite the anchor point of the band and each of these free ends is provided with an operating ear 8 comprising a base portion 9 secured to the free end of the band and an extension portion 10, to one side of the center of the base portion doubled back upon itself as at 11. The ears are reversely mounted so that the extension 10 and bent back portions overlap as shown in Fig. 1.

An operating lever 12 is provided with a right angle arm 13. The free end of this arm is connected to a pin 14 supported in openings 15 and 16 in the extension 10 and bent back portion 11 of the upper ear of the band. The opposite end of the right angle lever 13 is similarly connected to a pin 17 in the bottom ear 9' of the band, the lower end of the lever 12 is connected through a link mechanism 18 with the bottom end 19 of the brake operating lever 20 pivoted to the transmission housing. This connecting linkage 18 comprises a U shaped member 18', the two ends of which are pivotally connected to the lever 12. A rod 21 extends through the base of the U and interposed between a nut 22 on the rod and at the base of the U is a coiled spring 23, which provides a slightly resilient connection between the brake operating lever 20 and the lever 12. For supporting the free ends of the brake band, a supporting arm 24 is secured by the bolts 25 to the side of the transmission housing and has its free end received between the portions 10 and 11 of each of the ears 9. This support 24 is provided with elongated slots 26 and 27 to accommodate the movement of the pins 17 and 14 and when the parts are in their normal or released position the lower portion of the brake band is prevented from dropping away from the drum by the support of the arm 24 and the upper end of the brake band is held away from the brake drum due to the fact that the pin 17 is resting in the bottom of the slot 26 with the lever rocked to maintain the upper end of the band raised.

For maintaining the brake set I provide a dog 28 pivoted on the lever 19 having a tooth 29 adapted to engage in the ratchet 30 on the arm 31, which is stationarily mounted on the bolts 25. This dog is manipulated by a rod 32 adjacent the lever 20. In operation, when the lever 20 is shifted to the left looking at Fig. 1, the lever 12 is pulled to the right thereby rocking the arm 13 tending to raise the pin 17 and draw the pin 14 downwardly thus contracting the brake band on the drum. A reverse movement of the parts will, of course, expand the brake band and release the brake.

I claim as my invention:

1. In an automobile brake, the combination with a brake band, of an arm extending transversely of the band, pivot pins extending through the opposite ends of the arm and through the ends of the band to connect its opposite ends to the free ends of the band, means for rocking said arm to exert a pull in opposite directions on the free ends of said band and means for anchoring said free ends against transverse displacement.

2. In an automobile brake, the combination with a brake band, of an arm extending transversely of the band, pivot pins extending through the opposite ends of the arm and through the band whereby the arm is connected at each end to the free ends of the brake band, means for rocking said arm to exert a pull in opposite directions on the free ends of the band, and means for limiting the rocking movement of the arm at least in one direction.

3. In an automobile brake, the combination with a brake band having extensions at its opposite free ends lying side by side, a transversely extending arm, pivot pins extending through the ends of the arm and the free ends of the band whereby the arm is pivotally connected to said extensions, means for rocking said arm to exert a pull in opposite directions of said free ends of the brake band, and supporting means for the free ends of the band which prevents lateral displacement thereof while permitting longitudinal movement of the ends.

4. In an automobile brake, the combination with a brake band, of a lever having a transverse arm, pivot pins extending through the free ends of the arm and the free ends of said band so that each point of connection forms a fulcrum for the lever in its action on the opposite end of the band and means independent of the band for preventing transverse displacement of the lever.

5. In an automobile brake, the combination with a brake band having extensions on each of its free ends lying side by side and a lever having a transverse arm and pivot pins extending through its ends and through said extensions and means engaged by the pivot pins for preventing transverse displacement of the ends of the band.

6. In an automobile brake, the combination with a brake band having extensions on each of its free ends lying side by side, pivot pins connected to each of said extensions, a supporting member having slots through which said pivot pins extend, a lever having a transversely extending arm connected at its opposite ends to said pins.

7. In an automobile brake, the combination with a brake band having extensions on each of its ends lying side by side, each of said extensions being bent back to form a stirrup, an operating lever having transversely extending arms lying within said stirrups and pins extending through said stirrup and the opposite ends of the arm for connecting the same to the stirrup.

8. In an automobile brake, the combination with a stationary support, of a brake band having overlapping extensions lying in the same plane and slidably embracing said support, a transversely extending arm, pivot pins extending through the overlapping ends of said brake band and the free ends of said arm and passing through slots in said support, and a rocking lever for said transversely extending arm.

OTTO E. FISHBURN.